March 15, 1966 KAZUYUKI SHIRAKURA ET AL 3,239,914

METHOD OF MAKING MAGNETIC HEADS

Filed April 22, 1960 2 Sheets-Sheet 1

Inventors
Kazuyuki Shirakura
Kazuo Suzuki
Takayoshi Matsuzaka
Juzo Akiyama by Hill, Sherman, Meroni, Gross & Simpson Attys.

METHOD OF MAKING MAGNETIC HEADS

Filed April 22, 1960

Inventors
Kazuyuki Shirakura
Kazuo Suzuki
Takayoshi Matsuzaka
Juzo Akiyama
by Hill, Sherman, Meroni, Gross & Simpson Attys.

United States Patent Office 3,239,914
Patented Mar. 15, 1966

3,239,914
METHOD OF MAKING MAGNETIC HEADS

Kazuyuki Shirakura, Kazuo Suzuki, Takayoshi Matsuzaka, and Juzo Akiyama, Tokyo, Japan, assignors to Sony Kabushikikaisha (Sony Corporation), Tokyo, Japan, a corporation of Japan Filed Apr. 22, 1960, Ser. No. 24,163
Claims priority, application Japan, Nov. 13, 1959, 35,916/59
3 Claims. (Cl. 29—155.5)

This invention relates to a magnetic head for a magnetic recorder and a method of making the same, and more particularly to a method of mass production of magnetic heads.

It has been common in the past in the manufacture of magnetic heads such as recording, reproducing or erasing heads for magnetic recorders to assemble the component parts of a magnetic head and to thereafter treat the operating surface of each individual magnetic head by polishing for precise finishing of such surface, one by one.

Such a method of making a magnetic head (heretofore known) was troublesome and had the disadvantage that in the mass production of magnetic heads it was difficult to produce heads having substantially the same characteristics.

Accordingly, one object of this invention is to provide a method of making magnetic heads in which a group of unfinished magnetic head members are simultaneously polished and given a precise finish to provide all of such magnetic heads with substantially the same characteristics.

Another object of this invention is to provide a method of making magnetic heads in which a plurality of magnetic head members are arranged and combined by a plastic material in a mold to form a molded bar structure which is ground and finished effectively and speedily without breaking the molded bar structure.

A further object of this invention is to provide a method of making a magnetic head in which a plurality of magnetic head members, each composed of two magnetic head elements which are secured together in an auxiliary frame, can be simultaneously ground and finished to a desired shape.

A still further object of this invention is to provide a magnetic head which has a superior magnetic shielding device, leads and means for mounting the magnetic head itself simply and effectively to any other desired body.

Other objects, features and advantages of this invention will be more fully understood from the following detailed description taken in connection with the accompanying drawings, in which.

Figure 1:
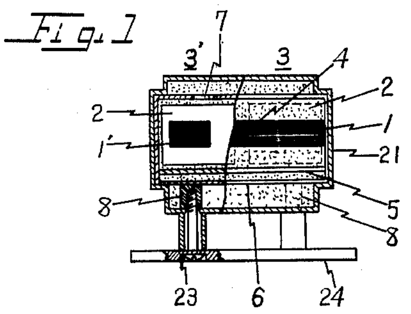
FIG. 1 is an enlarged partial sectional view of a magnetic head, by way of example, which is manufactured according to the method of this invention.
Figure 2:
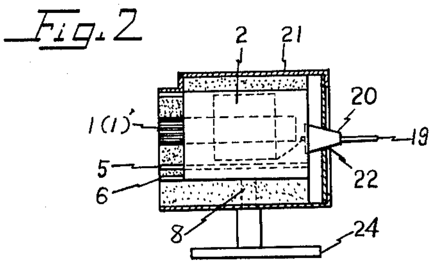
FIG. 2 is a side view of the magnetic head shown in FIG. 1.
Figure 3:
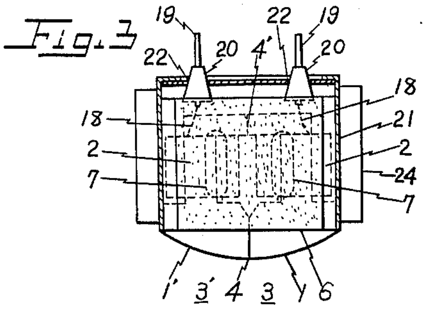
FIG. 3 is a plan view of the magnetic head shown in FIG. 1.
Figure 4:
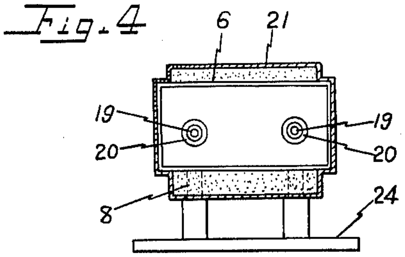
FIG. 4 is a back view of the magnetic head shown in FIG. 1.

Referring to the drawings, we will explain the method of making a magnetic head according to this invention.

In FIGS. 1, 3, 5 and 6, a pair of magnetic head elements 3 and 3′ which have respective magnetic cores 1 and 1′ and coils 2 respectively wound thereon is provided.

One pair of the magnetic head elements 3 and 3′ are arranged oppositely with each other in an auxiliary frame 6 to form an operating air gap 4 and a rear air gap 4′.

Figure 5:
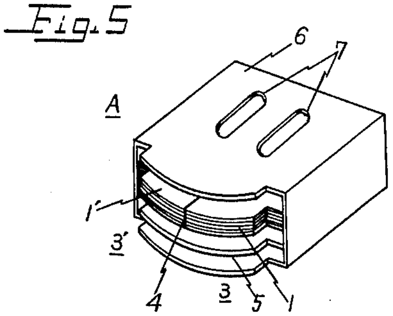
FIG. 5 is an enlarged perspective view of an incomplete magnetic head or a magnetic head member for illustrating the method of manufacturing magnetic heads according to this invention.
Figure 6:
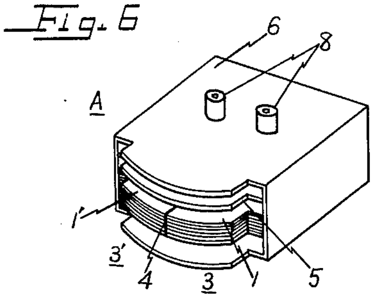
FIG. 6 is an enlarged perspective view of another type of incomplete magnetic head.

A magnetic shielding plate 5 can be attached to one side of the combined elements, if desired. One side of the auxiliary frame 6 has apertures 7 as shown in FIGS. 1 and 5 and the other side thereof has plugs 8 as shown in FIGS. 1 and 6. The above structure is referred to in this specification as a magnetic head member and is designated generally as A.

Figure 7:
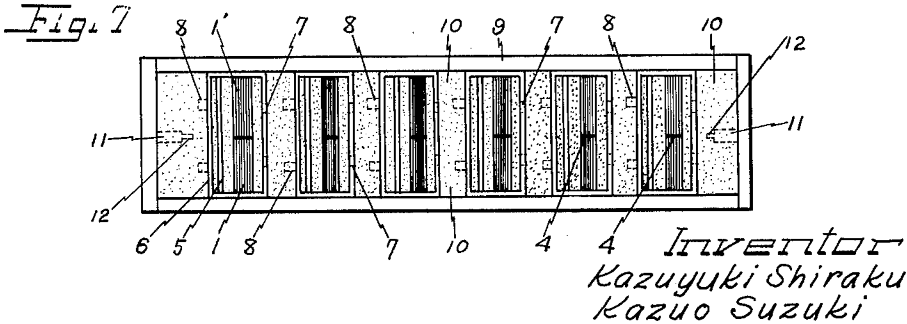
FIG. 7 is a front view of a mold in which a plurality of magnetic head members are arranged and combined by a plastic material poured therein.

Then a plurality of the magnetic head members thus obtained are disposed a predetermined distance apart in a mold 9 as shown by FIG. 7.

It will be appreciated that the side wall of the auxiliary frame having the apertures 7 of one magnetic head member is arranged facing the side wall of the auxiliary frame having the plugs of the adjacent magnetic head member, and that the operating air gaps 4 of the magnetic head members A are aligned with a predetermined spacing along the longitudinal direction of the frame 9 so as to form substantially the same continuously curved upper surface.

The thus arranged magnetic head members are integrally united by a plastic material 10 such as a synthetic resin poured into the mold 9, the space in the mold being occupied by the fused plastic material which is passing through the apertures 7 of one side wall of the auxiliary frame. At the same time, the fused plastic material occupies the space around the plugs 8 between the opposite walls of the adjacent auxiliary frame and unites firmly therewith when hardened. Thus the magnetic head members are integrally united by the plastic material 10 in the mold 9.

Figures 8, 9, 10, 11:
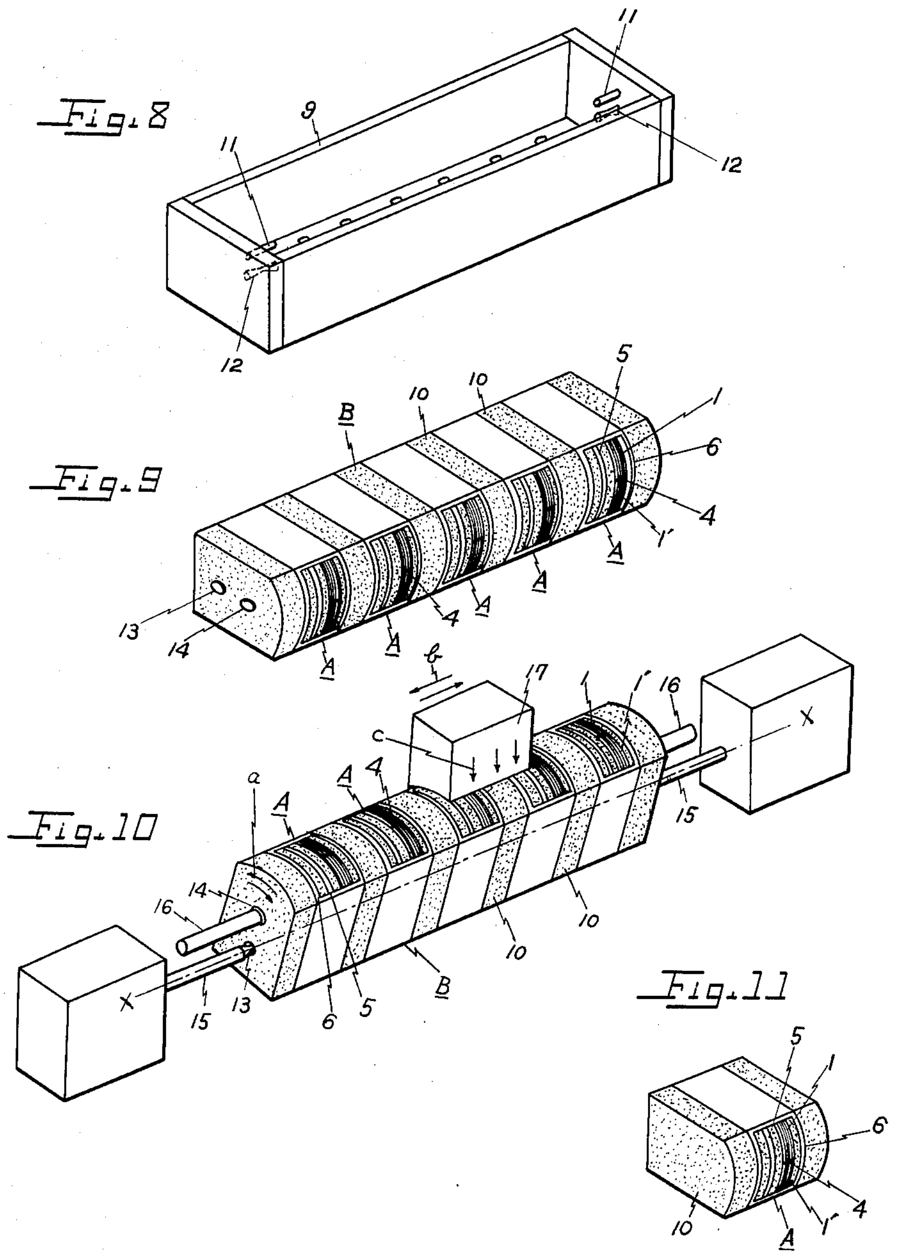
FIG. 8 shows a perspective view of a mold, by way of example.
FIG. 9 is a perspective view of a molded bar structure removed from a mold.
FIG. 10 is a perspective view of an arrangement illustrating the process of grind finishing of the molded bar structure.
FIG. 11 is a perspective view of a magnetic head member made by cutting the molded bar structure after it has been ground.

FIG. 9 shows the combined magnetic head members as they are removed from the mold. A molded bar structure B formed by combining five magnetic head members is shown in this figure. It will be understood that any desired number of magnetic head members may be formed into a molded bar structure.

To harden the fused plastic material it is convenient that the mold 9 with a poured thermoplastic material therein be passed through a tunnel furnace or the like.

A pair of center axes 11 and a pair of eccentric axes 12 are provided on the opposite inside wall of the mold 9 as shown in FIG. 8 so that a pair of center holes 13 corresponding to the pair of center axes 12 and a pair of eccentric holes 14 corresponding to the pair of excentric axes 12 are formed at the end faces of the molded bar structure B when it is removed from the disassembled mold as shown in FIG. 9. The center holes serve to receive supporting shafts 15 along the center line or axis X—X and the eccentric holes serve to receive driving shafts 16 as shown in FIG. 10. Accordingly the molded bar structure B can be rotated about the shafts 15 when the driving axes 16 are forced to reciprocally rotate around the shafts 15 by any suitable driving device, as shown by the arrow *a*. Upon the rotating motion, the operating air gap parts of the magnetic head members are initially and simultaneously subjected to rough grinding, such by way of example by a cylindrical grinding machine to form the desired curved surface, and then the curved surface is simultaneously finished by a grinder 17 which is pressed against the curved surface as shown by the arrow C and which is reciprocally moved at a suitable speed along the longitudinal direction of the molded bar structure B as shown by the arrow *b*, during the rotating operation of the bar structure. In this case, the grinder can be vibrated at a comparatively higher frequency along the center line X—X during the reciprocal linear movement.

The above mentioned method of precise finishing can be also applied to the rough grinding by using a rough whetstone.

In some cases, the auxiliary frame 6 may have apertures only and the plugs may be dispensed with and vice versa.

It will be noted that the head members are not fully rotated about the axis X—X are reciprocally rotated within some subtend angle.

Such a movement enables precise finishing of the operating surface of the head member.

After the precise finishing is done, the molded bar structure is then divided along the plane 9 perpendicular to the axis X—X by a cutting tool into individual magnetic heads as shown in FIG. 11.

Each magnetic head thus obtained is put into a shielding case and locked therein as hereinafter described.

According to this invention, a plurality of magnetic head members A are integrally combined by a plastic material 10 and the surface thereof simultaneously finished thereby eliminating the individual mechanical finishing as customarily done in the past. The method of manufacturing magnetic heads according to this invention has the advantage that magnetic heads having superior and substantially the same characteristics can be made efficiently produced by mass production and at relatively low cost.

It will be appreciated in this invention that the auxiliary frame 6 is provided with either the apertures 7 or the plugs 8 or both so that the fused plastic material may be effectively united therewith.

The molded bar structure B may be effectively finished without fear of breaking. The mechanical strength of the individual magnetic heads cut from the molded bar structure is also great.

Before the molding operation, a pair of lead pins 19 connected to lead wires 18 for the coils 2 are provided and each lead pin 19 passes through a cone shaped insulation bushing 20 which may be made of a thermoplastic material or an elastic material such as synthetic or natural rubber, the inner end of the pin 19 being buried in the molded bar structure B at the opposite side of the operating surface of the head, where there is no wall part of the auxiliary frame. The intermediate tapered portion of the cone type bushing 20 abuts against the edge of a hole 22 which is formed on the magnetically shielded case 21 in which the finished magnetic head as hereinbefore described is enclosed. The plugs 8 projected from the auxiliary frame 6 extend further through the wall of the case 21 to the outside and the projected free end of the plugs are mounted on a base 24 by means of screws 23 as shown in FIG. 1. Thus convenient means is provided for leads to the coil and for supporting the head.

Moreover, the pin 19 may be placed on a bobbin (not shown) onto which the coil will be wound and the end of the lead wire 18 may be connected to the inner end of the pin 19.

It will be understood that many modifications and variations may be effected without departing from the scope of the novel conceptions of this invention.

What is claimed is:

1. A method of making magnetic heads which includes assembling a pair of separate core parts with respective legs thereof extending toward each other and having end faces in confronting relation to define an operating non-magnetic gap, the legs having arcuate outer surfaces joining with the ends faces of the legs at said gap and extending from the gap in respective opposite directions to provide a head core having a median plane bisecting said arcuate outer surfaces and said end faces of said legs, inserting the head core in an auxiliary frame of open rectangular cross section with an open end of the frame having end faces of arcuate configuration corresponding to and aligned with the arcuate outer surfaces of said legs to form an individual head member, placing a plurality of the head members in spaced relation along a longitudinal axis of a mold with the median planes of the head members parallel and disposed at right angles to the longitudinal axis of the mold and with the operating non-magnetic gaps in alignment with respect to a direction parallel to the longitudinal axis of the mold and with the arcuate outer surfaces of the head members aligned substantially on a common arcuate surface, thereafter pouring a liquid plastic material into the mold to fill the spaces between the individual head members and to unite integrally said head members into a molded bar structure having a longitudinal axis corresponding to the longitudinal axis of the mold and having a surface generally conforming with the arcuate outer surfaces of the head cores, thereafter moving a grinder progressively along the surface of the bar structure parallel to the longitudinal axis of the bar structure while oscillating the bar structure about said longitudinal axis to form said surface of the molded bar structure including the respective arcuate surfaces of the successive head cores into a relatively smooth arcuate surface, and thereafter severing the bar structure between the frames of the successive head members to provide separate and individual head units each including a portion of said relatively smooth arcuate surface adjacent the operating gap thereof.

2. A method of making magnetic heads which includes forming a plurality of individual magnetic head members each comprising a magnetic core having confronting pole portions and a signal coil assembled thereon, disposing a plurality of said magnetic head members at predetermined spaced distances from each other within a mold, thereafter pouring a liquid plastic material into said mold to fill the spaces between the individual head members to unite integrally said magnetic head members into a molded bar structure upon hardening thereof, removing said molded bar structure thus obtained from said mold, grinding the operating surfaces of said magnetic head members while part of said molded bar structure, thereafter dividing said molded bar structure into individual magnetic heads, said grinding being accomplished by providing a mold having opposite side walls with a pair of center axes and a pair of eccentric axes in the longitudinal direction of said mold thereby providing a molded bar structure with a pair of center holes and a pair of eccentric holes formed respectively corresponding to said center axes and eccentric axes at both ends thereof when said molded bar structure is removed from said mold, inserting supporting shafts in said center holes, inserting driving shafts in said eccentric holes and reciprocally oscillating said molded bar structure through a predetermined angle, pressing a grinding member against the surface of said molded bar structure as it is reciprocally moved in the longitudinal direction of said molded bar structure to grind the same prior to dividing said bar structure.

3. The method of claim 2 including the step of vibrating said grinding member at a relatively high frequency in the longitudinal direction during the reciprocal movement of the grinding member.

References Cited by the Examiner

UNITED STATES PATENTS

| | | | |
|---|---|---|---|
| 2,676,392 | 4/1954 | Buhrendorf | 29—155.58 |
| 2,677,019 | 4/1954 | Buhrendorf | 179—100.2 |
| 2,754,569 | 7/1956 | Kornei | 179—100.2 X |
| 2,769,866 | 11/1956 | Kornei | 179—100.2 |
| 2,846,823 | 8/1958 | Malone et al. | 51—65 |
| 2,875,486 | 3/1959 | Morin | 264—328 |
| 2,916,560 | 12/1959 | Mathez | 179—100.2 |
| 2,920,149 | 1/1960 | Koren | 179—100.2 |
| 2,949,707 | 8/1960 | Staelin | 51—59 X |
| 3,000,078 | 9/1961 | Emenaker et al. | 29—155.58 X |
| 3,058,200 | 9/1962 | Duinker | 29—155.56 |

FOREIGN PATENTS

| | | |
|---|---|---|
| 1,028,968 | 3/1953 | France. |
| 874,338 | 8/1961 | Great Britain. |

WHITMORE A. WILTZ, *Primary Examiner.*

NEWTON N. LOVEWELL, JOHN F. CAMPBELL, *Examiners.*